United States Patent [19]

Keenan

[11] Patent Number: 5,317,403
[45] Date of Patent: May 31, 1994

[54] FAVORITE CHANNEL SELECTION USING EXTENDED KEYPRESS

[75] Inventor: Douglas M. Keenan, Noblesville, Ind.

[73] Assignee: Thomson Consumer Electronics, Inc., Indianapolis, Ind.

[21] Appl. No.: 907,917

[22] Filed: Jun. 26, 1992

[51] Int. Cl.$^5$ .............................................. H04N 5/44
[52] U.S. Cl. .................................. 348/731; 455/186.1; 455/185.1; 348/734
[58] Field of Search ............... 358/191.1, 194.1, 193.1; 455/179.1, 181.1, 185.1, 186.1, 186.2; 359/146; H04N 5/44

[56] References Cited

U.S. PATENT DOCUMENTS

| | | | |
|---|---|---|---|
| 4,836,436 | 5/1983 | Kocher et al. | 358/194.1 |
| 5,020,139 | 5/1991 | Keenan | 358/194.1 |
| 5,034,819 | 7/1991 | Tsukagoshi | 358/194.1 |
| 5,157,496 | 10/1992 | Kurosawa | 358/194.1 |
| 5,191,423 | 3/1993 | Yoshida | 358/191.1 |

OTHER PUBLICATIONS

Operating Guide for The Ford Electronic Sound System, pp. 2, 3, 6, 7, 10 11, 14 & 15, 1988.

Primary Examiner—Mark R. Powell
Assistant Examiner—Jeffrey S. Murrell
Attorney, Agent, or Firm—Joseph S. Tripoli; Peter M. Emanuel; Thomas F. Lenihan

[57] ABSTRACT

A television receiver provides a "favorite channel" selection function for up to ten favorite channels without the addition of a dedicated array of keys. According to the present invention, a user holds-down a digit key for an extended period of time (preferably 3 seconds), and circuitry in the television receiver interprets this "extended keypress" as an instruction to tune favorite channel "N" where "N" corresponds to the digit key pressed. Two digit channel entry can be accomplished as usual by releasing the digit keys in less than the extended period of time (i.e., less than three seconds). An extended keypress of a CHANNEL UP or CHANNEL DOWN key is interpreted as a command to store the currently tuned channel in the favorite channel memory in the location specified by the number of the next digit key pressed. CHANNEL UP and CHANNEL DOWN functions can be accomplished as usual by releasing the CHANNEL UP or CHANNEL DOWN key in less than the extended period of time (i.e., less than three seconds). Alternatively, a separate MEMORY key may be employed for storing favorite channel information. Pressing the MEMORY key serves as a command to store the current channel in the favorite channel memory location identified by the next digit key pressed.

11 Claims, 5 Drawing Sheets

FAVORITE CHANNEL SELECTION USING EXTENDED KEYPRESS

This invention concerns television receivers having memory locations for storing a list of a viewer's favorite television channels and having numeric keyboards for direct channel access.

BACKGROUND OF THE INVENTION

It is now commonplace for cable television system subscribers to have access to 40 channels or more. Of the available channels, it is likely that a viewer will have certain "favorites" which he watches more often than the others. For example, a viewer may have a favorite channel for news reports, another for sports, and yet another for entertainment.

A television receiver model AV2771S, manufactured by JVC Corporation, Japan, provides a menu-selectable list of five "favorite channels" stored in each of five categories, "NETWORKS", "MOVIES", "SPORTS", "NEWS", AND "CHOICE". However, it is felt that having a call up a menu and then having to select a menu entry for channel selection defeats a prime advantage of the favorite channel function. That is, a "favorite channel" function should provide a quick and easy way for a viewer to return to a desired channel from any other channel.

One way to provide quick and easy access to the favorite channel function is to provide an array of dedicated keys, one for each favorite channel. An example of such a system is the FORD Electronic Search AM/FM Stereo Radio installed in certain 1988 Mercury Sable automobiles. This radio includes 6 dedicated station memory preset buttons for selecting preferred AM and FM stations. Unfortunately, with systems employing dedicated keys, a number of extra keys must be added to the keyboard, making it both costly and complex.

SUMMARY OF THE INVENTION

It is herein recognized that it is desirable that a television receiver provide a favorite channel selection function for up to ten favorite channels without the addition of a dedicated array of keys. In apparatus according to the present invention, a user depresses a digit key for an extended period of time (preferably 3 seconds), and circuitry in the television receiver interprets this "extended keypress" as an instruction to tune favorite channel "N", where "N" corresponds to the digit key pressed. Two digit channel entry can be accomplished as usual by releasing the digit keys in less than the extended period of time (i.e., less than three seconds). An extended keypress of a CHANNEL UP or CHANNEL DOWN key is interpreted as a command to store the currently tuned channel in the favorite channel memory in the location specified by the number of the next digit key pressed. CHANNEL UP and CHANNEL DOWN functions can be accomplished as usual by releasing the CHANNEL UP or CHANNEL DOWN key in less than the extended period of time (i.e., less than three seconds). In the event that a separate MEMORY key is desired for storing favorite channel information, a pressing of the MEMORY key serves as a command to store the current channel in the favorite channel memory location identified by the next digit key pressed.

DETAILED DESCRIPTION OF THE EMBODIMENT

Figure 1:
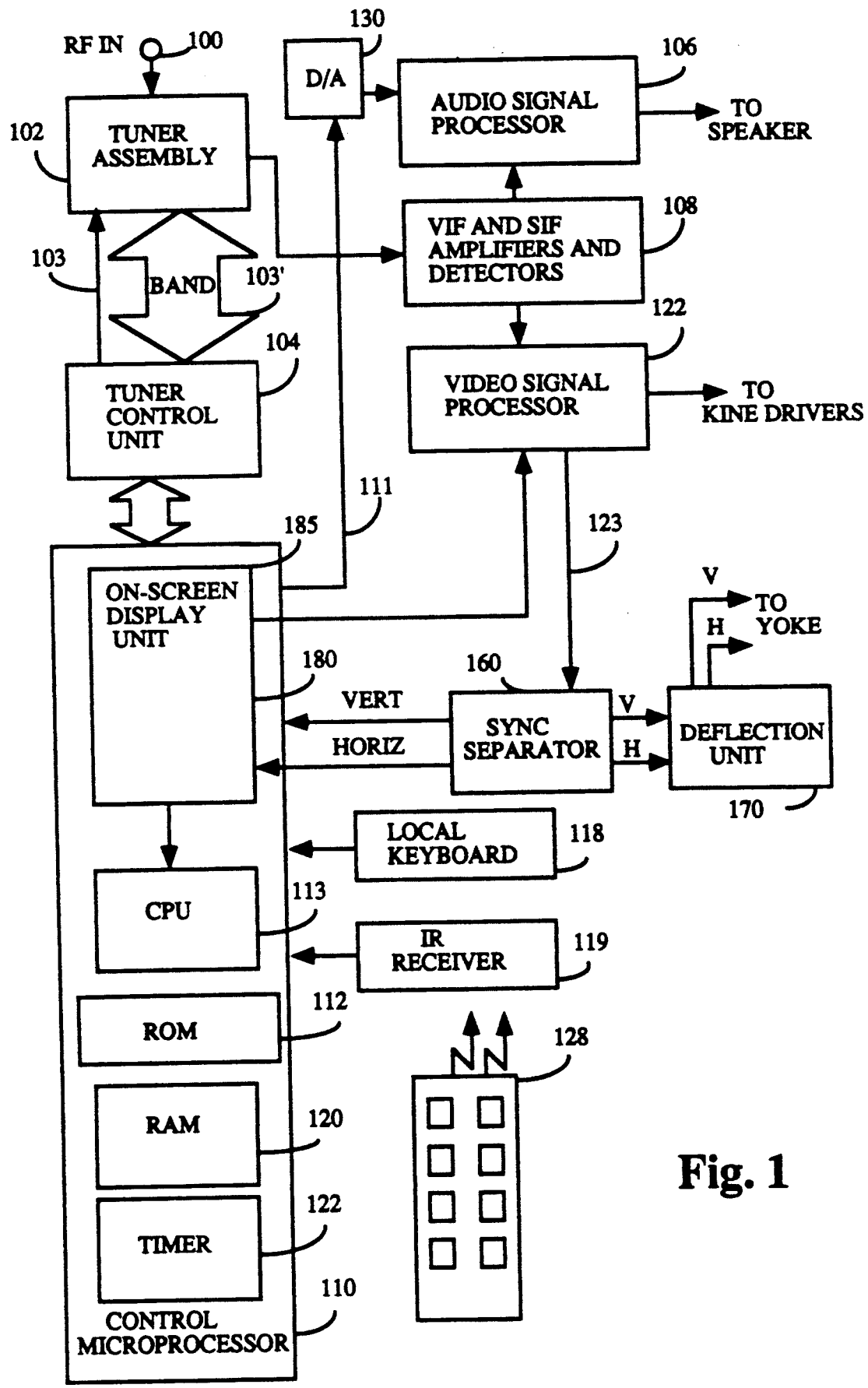
FIG. 1 shows, in block diagram form, an apparatus suitable for practicing the invention.

Referring to FIG. 1, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103'.

Tuner assembly 102 converts the received RF signal to an intermediate frequency (IF) signal and provides an IF output signal to video (VIF) and sound (SIF) amplifier and detector unit 108. VIF/SIF amplifier and detector unit 108 amplifies the IF signal applied to its input terminal and detects the video and audio information contained therein. The detected video information is applied as one input of a video processor unit 122. The detected audio signal is applied to an audio processor 106 for processing and amplification before being applied to a speaker (not shown).

Video signal processor 122 supplies a composite video signal to a sync separator unit 160 which produces vertical (V) and horizontal (H) synchronizing signals at respective outputs. The horizontal and vertical synchronizing signals are applied to a horizontal and vertical deflection unit 170 for generating scanning control signals for application to the yoke windings of a picture tube assembly (not shown).

Tuner controller 104 (which may be within control microcomputer 110) generates the tuning voltage and bandswitching signals in response to control signals applied from a system control microcomputer ($\mu$C) 110. The terms "microcomputer" and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 119 and from a "local" keyboard 118 mounted on the television receiver itself. IR receiver 119 receives IR transmissions from remote control transmitter 128. Microcomputer 110 includes a central processing unit (CPU) 113, a program memory (ROM) 112, and stores channel-related data in a random-access memory (RAM) 120. RAM 120 may be either internal to, or external to, microprocessor 110, and may be of either the volatile or non-volatile type. The term "RAM" is also intended to include electrically-erasable programmable read only memory (EEPROM). One skilled in the art will recognize that if volatile memory is utilized, that it may be desirable to use a suitable form of standby power to preserve its contents when the receiver is turned off.

Microprocessor 110 may also include an on-screen display unit (OSD) 185 for generating auxiliary signals suitable for displaying indicia, such as characters, for display on the display screen of the picture tube. Alternatively, on-screen display unit 185 may be external to microprocessor 110.

Microprocessor 110 also includes a timer 122 for timing an interval under control of CPU 113. In the alternative, timer 122 may be external to microprocessor 110, or the timing function may be accomplished in software by, executing sets of instructions which cause the occurrence of precisely defined delay periods. These sets of instructions are usually in the form of subroutines, known in the art as timing loop subroutines, which are called by the CPU, as needed. The television receiver described thus far is known from the RCA CTC-140 color television receiver manufactured by Thomson Consumer Electronics, Inc., Indianapolis, Ind.

Figure 2:
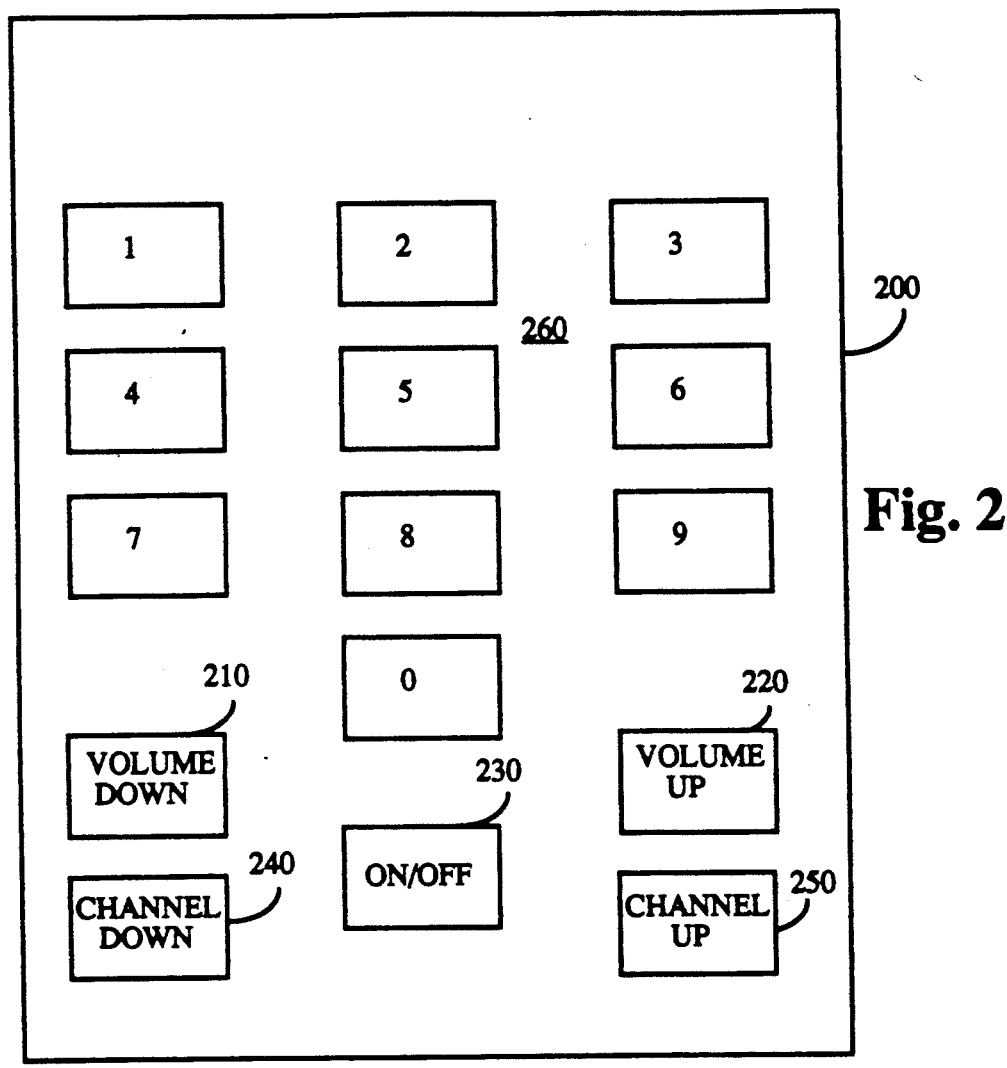
FIGS. 2 and 6 show keyboards of remote control units suitable for use with the invention.
Figure 6:
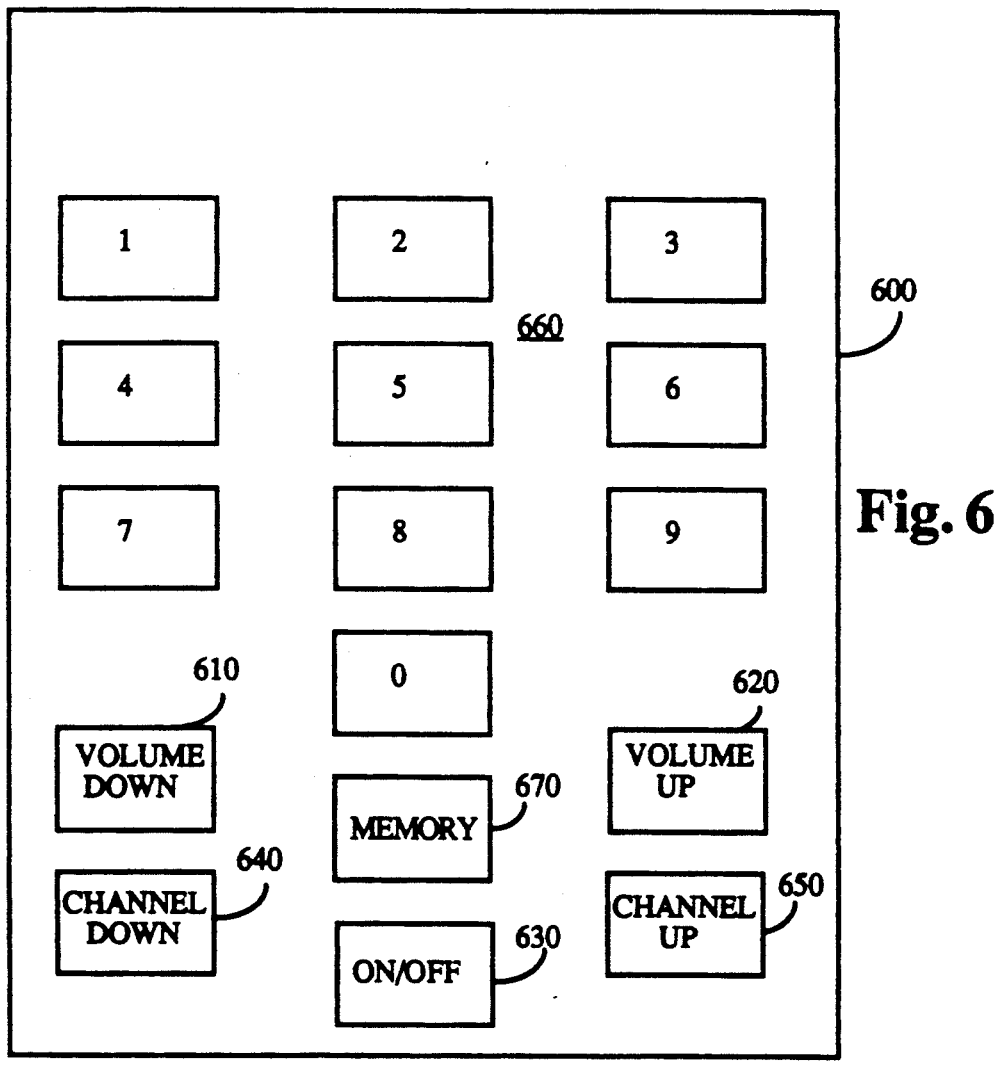

FIGS. 2 and 6 show alternative keyboards 200 and 600 for remote control transmitter 125 for controlling a color television receiver. Keyboard 200 includes a VOLUME DOWN key 210, a VOLUME UP key 220, and ON/OFF key 230, a CHANNEL DOWN key 240, a CHANNEL UP key 250, and a 0-9 numeric keypad, generally designated 260, for entering numeric data, such as channel number. Keyboard 600 includes all of the above-listed keys (designated with similar reference numerals, except for the hundreds digit) and an additional MEMORY key 670, the function of which will be discussed below.

The present invention is directed to a favorite channel data entry system for a television receiver employing a numeric keyboard, which system allows the selection of up to ten favorite channels without the use of a separate dedicated array of keys and without causing a user to access a menu. Specifically, when the leading digit of a keyboard entry is detected, the time interval in which the key is held pressed is measured. If the time interval during which the digit key is activated exceeds 3 seconds, then a favorite channel selection mode is enabled. If the measured time interval does not exceed 3 seconds, then a two digit channel entry mode is enabled, and the desired channel is tuned upon receipt of the final digit of the channel number.

Figure 3:
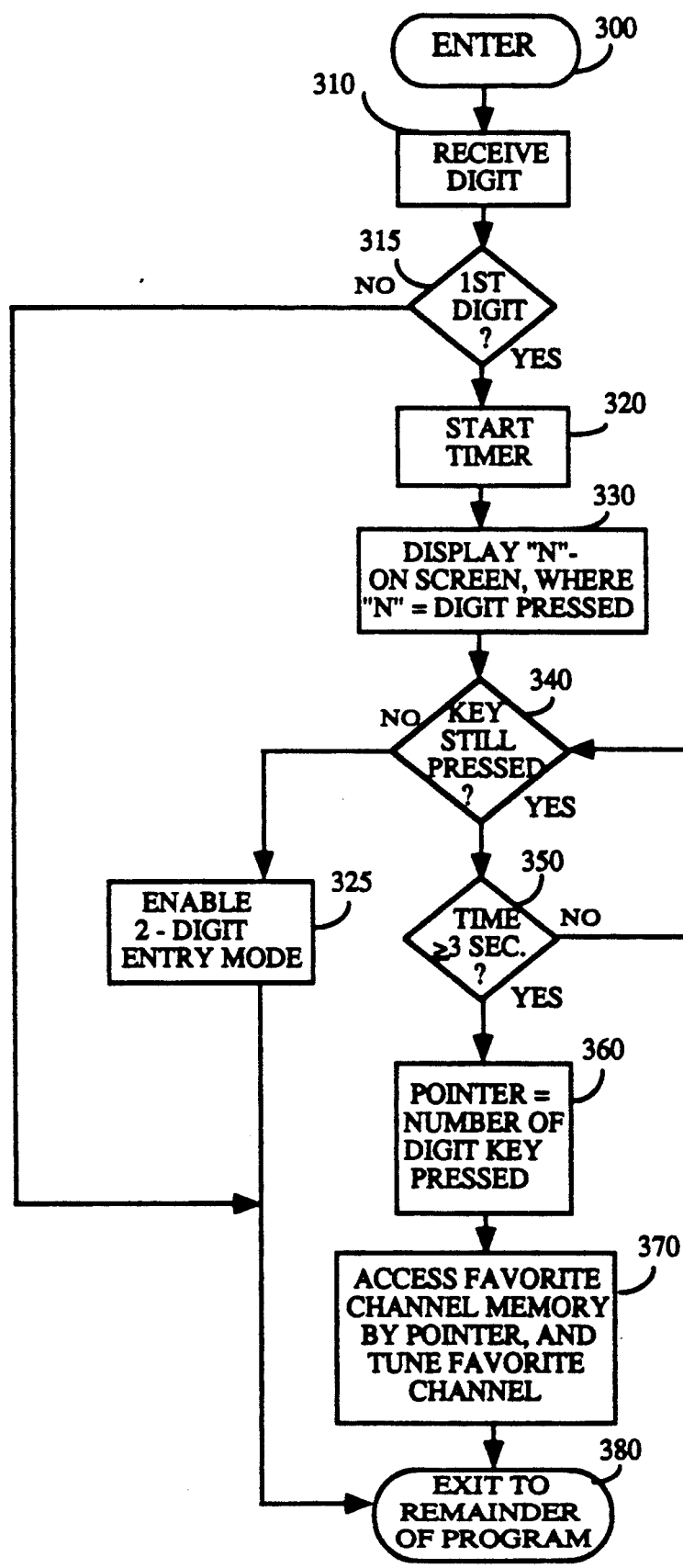
FIGS. 3 and 5 are flowcharts showing portions of the control program of the controller of FIG. 1.

An embodiment of the present invention will be described with reference to the flowchart of FIG. 3. FIG. 3 shows a portion of the keyboard decoding routine of the control program of microprocessor 110. The purpose of the portion of the routine shown in FIG. 3 is to detect the extended keypress of the digit keys which causes the enabling of the favorite channel selection mode. The usual keycode decoding and display functions are performed in another portion of the keyboard decoding routine of the control program of microprocessor 110. The keycode decoding and display functions are not shown in FIG. 3 because they are known per se and need not be described here.

The routine of FIG. 3 is executed each time a keycode is received. The routine is entered at step 300 and receives a digit from IR receiver 119, or from local keyboard 118, at step 310. At step 315, a check is made to determine if this is the first digit entered for this particular channel number. If so, then the program advances to step 320, at which timer 122 is started. At step 330, the message "N"- is caused to be displayed on the display screen, where "N" represents the number of the digit key pressed.

Figure 4:
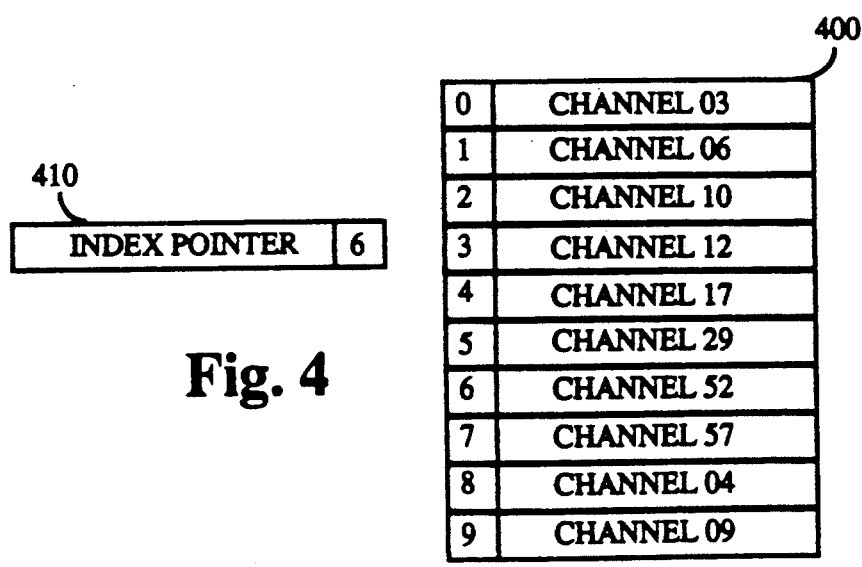
FIG. 4 shows a portion of the random access memory of the controller of FIG. 1.

According to the invention, a channel number and a favorite channel position may be distinguished from each other by the length of time in which the digit key for the leading digit is held activated. That is, if a digit key is held activated for a period of at least 3 seconds, then a favorite channel selection mode is enabled. If not, then a 2-digit channel number entry mode is enabled. Accordingly, at step 340 a check is made to see if the digit key is still pressed, if not then a short activation is detected, and the 2-digit entry mode is enabled at step 325. If the digit key is still held active by the user, then the program advances to a timing loop comprising steps 350 and 340, which times a 3 second period while repeatedly checking for a release of the digit key. As noted above, exercising the timing function of step 350 may entail either reading the output of a hardware timer such as timer 122, or executing a timing loop subroutine. If the 3 second time interval has expired, then the program advances to step 360 at which the number corresponding to the digit key pressed is entered into an index pointer register 410 as shown in FIG. 4. FIG. 4 also shows an array of 10 memory locations 400, numbered 0-9, hereinafter referred to as the favorite channel memory.

At step 370, favorite channel memory 400 is accessed by the index pointer register which causes the respective favorite channel information stored in the numbered location corresponding to the value in index pointer register 410 to be read out for tuning. By way of example, in FIG. 4, index pointer 410 is shown to contain the number "6", which indicates that the "6" digit key has been held activated for 3 seconds or greater. A "6" in index pointer 410 causes favorite channel memory location 6 to be accessed. In this example, favorite channel memory location 6 contains tuning data for causing the tuning of television channel 52. After obtaining the proper tuning data, the program is then exited at step 380 to the remainder of the keyboard decoding routines, known per se. Step 380 is also reached directly from step 315 for the second digit received, since the second digit does not affect the decision of whether or not the favorite channel selection mode is to be enabled.

Figure 5:
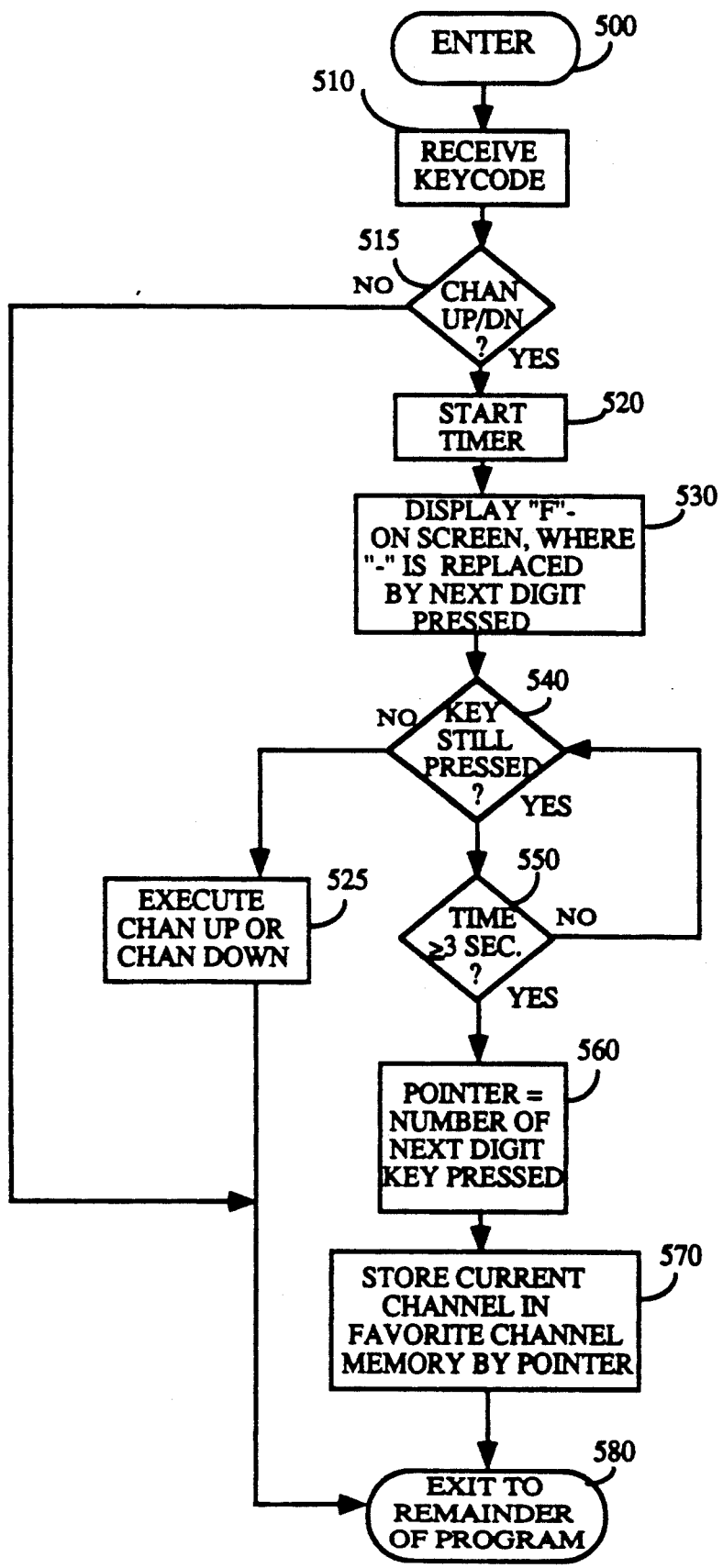

When a user wishes to store tuning information in favorite channel memory 400, the routine of FIG. 5 is executed. The favorite channel data storage routine is entered at step 500 and receives a digit from IR receiver 119, or from local keyboard 118, at step 510. At step 515, a check is made to determine if this is a CHANNEL UP or a CHANNEL DOWN command. If so, then the program advances to step 520, at which timer 122 is started. At step 530, the message "F"- is caused to be displayed on the display screen, where the dash is to be replaced by the number of the next digit key pressed.

According to the invention, a CHANNEL UP/DOWN command and a Store Current Channel as a Favorite Channel command may be distinguished from each other by the length of time in which a CHANNEL UP or a CHANNEL DOWN key is held activated. That is, if a CHANNEL UP or a CHANNEL DOWN key is held activated for a period of at least 3 seconds, then a Store Current Channel as a Favorite Channel mode is enabled. If not, then a channel up or channel down function is executed. At step 540 a check is made to see if the CHANNEL UP or CHANNEL DOWN key is still pressed, if not then a short activation is detected, and the channel up or channel down command is executed at step 525. If, at step 540, the CHANNEL UP or CHANNEL DOWN key is still held active by the user, then the program advances to a timing loop comprising steps 550 and 540, which times a 3 second period while repeatedly checking for a release of the CHANNEL UP or CHANNEL DOWN key. As noted above, exercising the timing function of step 550 may entail either reading the output of a hardware timer such as timer 122, or executing a timing loop subroutine. If the 3 second time interval has expired, then the program advances to step 560 at which the number corresponding to the next digit key pressed is entered into index pointer register 410 of FIG. 4.

At step 570, favorite channel memory 400 is accessed by the index pointer register which causes tuning data regarding the currently tuned channel to be stored in the numbered location corresponding to the value in index pointer register 410. By way of example, in FIG. 4, index pointer 410 is shown to contain the number "6", which indicates that the "6" digit key has been pressed after a CHANNEL UP or a CHANNEL DOWN key was held activated for 3 seconds or greater. A "6" in index pointer 410 causes tuning data corresponding to the currently tuned channel to be stored in favorite channel memory location 6. In this example, favorite channel memory location 6 is programmed to contain tuning data for causing the tuning of television channel 52 (which for purposes of explanation is the currently tuned channel). The program is then exited at step 580 to the remainder of the keyboard decoding routines, known per se. Step 580 is also reached directly from step 515 for the keys other than CHANNEL UP or CHANNEL DOWN which may be received, since those other keys do not affect the decision of whether or not the favorite channel storage mode is to be enabled.

An extended keypress for the storing of current channel tuning information is known from the FORD Electronic Search AM/FM Stereo Radio mentioned above. In that system if a key of the dedicated station preset array is pressed and held for about two seconds, the tuning information for the currently tuned radio station is stored in a memory. If that key is thereafter pressed and released quickly, the preset station is tuned. It is noted however, that this radio lacks a numeric keyboard for direct channel entry, and thus is forced to add the dedicated key array which the subject invention seeks to avoid.

It is important to note that preferred embodiment of the subject favorite channel selection system described above avoids the necessity of modifying the control program of the remote control unit, because the invention resides in the television receiver and not in the remote control unit. As a result of the fact that no modification of the remote control unit is necessary, existing remote control units may be used when practicing the invention.

Further advantages of the above-described preferred embodiment of the present invention are that keyboard complexity is not increased, the cost of adding an additional key is saved, and the cost modifying the control program of the remote control unit is saved.

Many modern multifunction television receivers employ a remote control unit having a keyboard including a relatively large number of keys. It is an advantage of the above-described preferred embodiment of the subject invention that further keys need not be added to the keyboard, in that the user will not be forced to search among a multitude of keys for yet another array of special purpose keys.

If it is felt that the CHANNEL UP and CHANNEL DOWN keys should not be shared with the favorite channel storage function, then a compromise may be reached by the addition of a MEMORY key even though the addition of the MEMORY key requires modification of the remote control handunit 128. In this embodiment of the invention, a keyboard such as the one shown in FIG. 6 is employed. The keyboards of FIGS. 2 and 6 are identical simplified keyboards except that the keyboard of FIG. 6 includes MEMORY key 670. In use, a short activation of MEMORY key 670 replaces the extended keypress of the CHANNEL UP and CHANNEL DOWN keys as described above.

The term consumer electronic equipment, as used herein, includes television receivers and radios. The term television receiver, as used herein, includes television receivers having a display device (commonly known as television sets) and television receivers without a display device, such as VCRs.

What is claimed is:

1. A radio frequency receiver, comprising:
    tuner means for selecting a radio frequency (RF) signal from a plurality of RF signals;
    memory means for storing tuning data relating to preferred ones of said RF signals;
    keyboard means including a plurality of numeric keys for generating keycodes corresponding to individual ones of said keys when said keys are activated by a user;
    control means for receiving said keycodes and for generating tuner control signals in response thereto for controlling said tuner means;
    said control means operating in a first mode for timing an interval during which a first keycode is received when said keycode corresponds to a predetermined value, said control means storing tuning data corresponding to a currently tuned one of said RF signals in said memory means when said interval exceeds a predetermined time period, and said control means processing said received keycode according to the content of said keycode when said interval does not exceed said predetermined time period;
    said control means operating in a second mode for timing an interval during which a first keycode is received when said keycode corresponds to a digit of said numeric keys, said control means reading stored tuning data corresponding to one of said RF signals from said memory means and tuning said RF signal when said interval exceeds a predetermined time period, and said control means operating in a third mode when said interval does not exceed said predetermined time period for generating one of said tuner control signals upon receiving the second of two of said numeric keycodes consecutively generated by said keyboard means.

2. The apparatus of claim 1 wherein said predetermined value corresponds to one of a CHANNEL UP keycode, a CHANNEL DOWN keycode, and a MEMORY keycode.

3. The apparatus of claim 1 wherein said predetermined time period is three seconds.

4. The apparatus of claim 1 wherein,
    said memory means includes a plurality of data storage locations; and during an operation to store channel data in said memory means, and during an operation to read data from said memory means, said control means uses the value of said first-received digit as a pointer to a particular memory location.

5. Television channel selection apparatus for a television receiver, comprising:

memory means for storing tuning data relating to preferred ones of said television channels;

keyboard means including a plurality of numeric keys for generating keycodes corresponding to digits of channel numbers when said keys are activated by a user;

control means coupled to said keyboard means for receiving said keycodes and for generating a tuning control signal in response thereto;

said control means operating in a first mode to generate said tuning control signal upon receiving the second digit of a two digit channel number, and operating in a second mode to generate said tuning control signal upon receiving an instruction to tune one of said preferred television channels;

said control means timing an interval during which data corresponding to the first digit of said two digit channel numbers is received, said control means operating in said second mode when said interval exceeds a predetermined time period, and operating in said first mode when said interval does not exceed said predetermined time period.

6. The apparatus of claim 5 wherein said predetermined time period is three seconds.

7. The apparatus of claim 5 wherein, said memory means includes a plurality of data storage locations; and during an operation to store channel data in said memory means, and during an operation to read data from said memory means, said control means uses the value of said first-received digit as a pointer to a particular memory location.

8. Television channel selection apparatus for a television receiver, comprising:

memory means for storing tuning data relating to preferred ones of said television channels;

keyboard means including a plurality of numeric keys for generating keycodes corresponding to digits of channel numbers when said keys are activated by a user;

control means for receiving said keycodes and for generating a tuning control signal in response thereto; and timing means for timing a predetermined time interval;

said control means examining a received keycode and starting said timing means if said keycode corresponds to one of a first-received digit of one of said numeric keys, or a predetermined keycode;

said control means measuring the duration of time in which said keycode is received, and if said duration of time reaches a predetermined value said control means performs one of storing current channel data in said memory means in accordance with a next entered numeric keycode if said received keycode is said predetermined keycode, and reading said memory means and tuning one of said preferred channels according to stored channel data if said received keycode is said first-received digit of one of said numeric keys;

if said duration of time does not reach said predetermined value said control means performs one of entering said digit as a first digit of a two digit channel number and processing said predetermined keycode according to its content.

9. The apparatus of claim 8 wherein, said predetermined keycode corresponds to one of a CHANNEL UP keycode, a CHANNEL DOWN keycode, and a MEMORY keycode.

10. The apparatus of claim 9 wherein, said predetermined duration of time is three seconds.

11. The apparatus of claim 8 wherein, said memory means includes a plurality of data storage locations; and during an operation to store channel data in said memory means, and during an operation to read data from said memory means, said control means uses the value of said first-received digit as a pointer to a particular memory location.

* * * * *